United States Patent
Hazay et al.

(10) Patent No.: US 10,749,798 B2
(45) Date of Patent: Aug. 18, 2020

(54) SYSTEM, DEVICE, AND METHOD OF DEPLOYING LAYER-3 TRANSPARENT CLOUD-BASED PROXY NETWORK ELEMENT

(71) Applicant: Allot Communications Ltd., Hod HaSharon (IL)

(72) Inventors: Alon Hazay, Ramat HaSharon (IL); Asaf Shahar, Kfar Saba (IL)

(73) Assignee: ALLOT COMMUNICATIONS LTD., Hod Hasharon (IL)

( * ) Notice: Subject to any disclaimer, the term of this patent is extended or adjusted under 35 U.S.C. 154(b) by 33 days.

(21) Appl. No.: 16/242,020

(22) Filed: Jan. 8, 2019

(65) Prior Publication Data
US 2020/0220814 A1   Jul. 9, 2020

(51) Int. Cl.
| | | |
|---|---|---|
| *H04L 12/721* | (2013.01) | |
| *H04L 12/46* | (2006.01) | |
| *H04L 12/26* | (2006.01) | |
| *H04L 12/715* | (2013.01) | |
| *H04L 29/06* | (2006.01) | |
| *G06F 9/455* | (2018.01) | |
| *H04L 12/713* | (2013.01) | |

(52) U.S. Cl.
CPC .......... *H04L 45/66* (2013.01); *G06F 9/45558* (2013.01); *H04L 12/4641* (2013.01); *H04L 43/028* (2013.01); *H04L 45/04* (2013.01); *H04L 45/586* (2013.01); *H04L 63/30* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 9,954,693 B2* | 4/2018 | Sergeev | H04L 49/3009 |
| 2010/0271935 A1* | 10/2010 | Allasia | H04L 12/433 |
| | | | 370/222 |
| 2019/0042326 A1* | 2/2019 | Chilikin | G06F 9/5077 |
| 2019/0042741 A1* | 2/2019 | Abodunrin | G06F 21/53 |
| 2019/0044869 A1* | 2/2019 | Wang | H04L 45/586 |
| 2019/0044871 A1* | 2/2019 | Hu | H04L 49/9005 |
| 2019/0044892 A1* | 2/2019 | Mangan | G06F 15/173 |

OTHER PUBLICATIONS

Rovnyagin et al. "Application of Hybrid Computing Technologies for High-Performance Distributed NFV Systems." 2017 IEEE Conference of Russian Young Researchers in Electrical and Electronic Engineering. IEEE Press. 2017. 540-543 (Year: 2017).*

* cited by examiner

*Primary Examiner* — Jeffrey R Swearingen
(74) *Attorney, Agent, or Firm* — Eitan Mehulal Sadot

(57) ABSTRACT

System, device, and method of deploying layer-3 transparent cloud-based proxy network element. A virtual network function is defined between a west-side router and an east-side router. A west-side interface receives east-bound traffic from a west-side Virtual LAN. East-bound queries from the west-bound router, are intercepted and responded to by the west-side interface, the response indicating the MAC address of the west-side router instead of the east-side router. The system enables the virtual network function to transparently intercept network traffic, and to selectively apply to such traffic one or more network functions or operations, prior to forwarding the traffic or a modified version thereof to the east-side router, in a Layer-3 transparent manner.

20 Claims, 1 Drawing Sheet

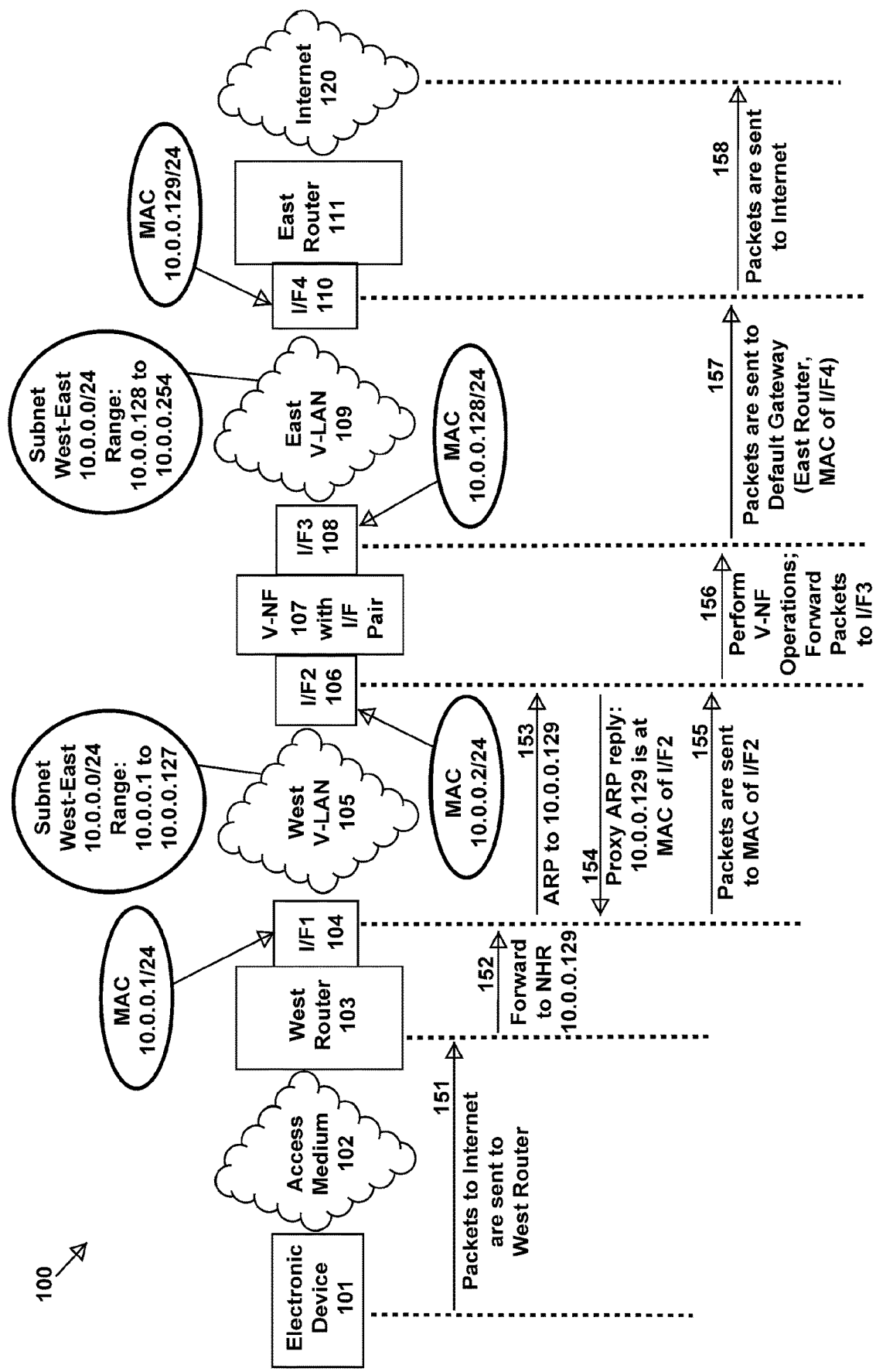

SYSTEM, DEVICE, AND METHOD OF DEPLOYING LAYER-3 TRANSPARENT CLOUD-BASED PROXY NETWORK ELEMENT

FIELD

The present invention relates to the field of telecommunication systems.

BACKGROUND

Electronic devices and computing devices are utilized on a daily basis by millions of users worldwide. For example, laptop computers, desktop computers, smartphone, tablets, and other electronic devices are utilized for browsing the Internet, consuming digital content, streaming audio and video, sending and receiving electronic mail (email) messages, Instant Messaging (IM), video conferences, playing games, or the like.

SUMMARY

Some embodiments of the present invention may provide systems, devices, and methods of constructing, deploying and/or implementing a transparent L2/L3 cloud-based proxy element (e.g., transparent cloud-based proxy server or proxy node or proxy network element; or a virtualized or emulated or simulated proxy element).

The present invention may provide other and/or additional advantages and/or benefits.

BRIEF DESCRIPTION OF THE DRAWINGS

FIG. 1 is a schematic illustration of a system, in accordance with some demonstrative embodiments of the present invention.

DETAILED DESCRIPTION OF SOME DEMONSTRATIVE EMBODIMENTS

The Applicants have realized that some Network Functions [NFs] may need to be deployed transparently in a telecommunication network. For example, such NF usually has two interfaces, and it is connected inline between two network elements (e.g., switches, routers). When the NF resides on a physical appliance, that appliance is connected with physical links to the other network elements; and network traffic that is forwarded or transported between those two network elements also flows through the NF appliance, as if that NF appliance was a link connecting between those two network elements; such that the NF is transparent to the network elements from Layer L2 and Layer L3 point of view; and such that the routers or switches can manage their routing protocols between them without interference by (or from) the NF appliance. This type of deployment has the benefit that it does not impose an operational overhead to the network, and does not limit the network from running any routing protocols as if that NF appliance was not inline within the network. Demonstrative examples of some NF applications that can be deployed as inline transparent appliances in a telecommunication network are: a Deep Packet Inspection (DPI) function or network element; a Firewall function or network element.

The Applicants have realized that when moving the NF from (i) being implemented as a physical appliance, into (ii) being implemented as a virtual machine or a cloud-based or virtualized component and deploying that NF in the cloud (e.g., as Network Function Virtualization, or NFV), conventional systems provide no technique to emulate physical wires or physical cables; and therefore, realized the Applicants, such virtualized NF can no longer connect (to other network elements) as L2-layer transparent, and the traffic from the routers or switches to that virtualized NF must be forwarded to the NF interface MAC.

The Applicants have realized that routing capabilities may be added to the virtualize NF, in order to enable it to connect to the network routers or switches via routing protocols and to act as the Next Hop Router (NHR) so the traffic between the routers will flow through the virtualize NF. This may allow NFV deployment in which the routers continue to use routing protocols the same as they do in an all-physical (non-virtualized) deployment. However, the Applicants have realized that the need for the virtualized NF to run routing protocols and to act as a router is a significant overhead for the virtualized-NF developer, and the routing capabilities normally have no benefit for the core application that the NF performs. The Applicants have also realized that this approach may have other disadvantages; for example, the need to program the virtualized-NF to support a set of particular routing protocols and/or communication protocols; a situation in which the virtualized-NF supports a limited set of pre-programmed routing protocols but does not natively support other routing protocols; a need to periodically update the programming of the virtualized-NF in order to support new or updated or modified routing protocols; consumption of increased memory resources, storage resources and/or processing resources by the virtualized-NF; or the like.

The Applicants have further realized that the NF may be used as a NHR relative to the routers in the network, yet instead of developing and implementing routing protocols within the virtualized-NF, a static route may be used. This approach, realized the Applicants, may somewhat simplify the additional routing functionality that is needed in the virtualized-NF; but it imposes operational overhead and complexity to the network, because of the need to utilize static routing rather than dynamic routing. The utilization of static routing may have various limitations, and/or may also negatively impact the network resiliency, network performance, network reliability, the ability of the network to accommodate changes in network topology, and/or other negative effects.

The Applicants have also realized that a system may utilize a programmable network fabric in the cloud, such as Software-Driven Networking or Software-Defined Networking (SDN), in order to forward traffic from the routers to the virtualized-NF based on pre-programmed rules in the network fabric. This approach, realized the Applicants, may eliminate the need for implementing routing protocol(s) within the virtualized-NF; however, programmable network fabric is still a vision for the future NFV cloud, and is not available in many networks or network-segments, such that this approach is not feasible in many or most NFV cloud deployments.

The Applicants have thus realized that there is a need for a virtualized-NF to be constructed, deployed, implemented, and efficiently operated in the NFV cloud, in a way that enables existing routers and switches to continue to perform dynamic routing using suitable routing protocols (which may change from time to time, or using newly-introduced routing protocols), and/or in a way that is not dependent on a particular or static network topology and which autonomously adjusts to changes in network topology, and/or in a way that enables the virtualized-NF to be an L3-layer transparent proxy and/or an L2-layer transparent proxy relative to the network and relative to other network elements (e.g., routers, switches); such that the virtualized-NF will not need to have pre-programmed dynamic routing capabilities of its own, but rather, such that the virtualized-NF would pass the routing protocols transparently through the virtualized-NF without interfering with other routers or switches on the network; and thus enabling the virtualized-NF to be deployed inline in the network, similarly to the way that a physical NF appliance is deployed in a physical network.

Reference is made to FIG. 1, which is a schematic illustration of a telecommunication system 100, in accordance with some demonstrative embodiments of the present invention. System 100 may comprise, or may be implemented by using, one or more suitable communication networks; for example, an Internet Protocol (IP) network or IP-based network, a cellular communication network (e.g., supporting 2G or 3G or 4G or 4G-LTE or 5G cellular communications), a Voice over IP (VoIP) network, a wireless network, a Wi-Fi or IEEE 802.11 network, a Wi-Max or IEEE 802.16 network, a satellite communication network, a wired network, a fiber optics network, a set of two or more networks that may include any combination of the above-mentioned networks which may be inter-connected with each other or which may otherwise be able to interface with each other, or the like.

In a demonstrative implementation, system 100 may comprise an electronic device 101, for example, a smartphone, a tablet, a laptop computer, a desktop computer, a server computer, a smart-watch, a gaming device, a vehicular device, an IP-connected device, an Internet-connected device, a Virtual Reality (VR) device, an Augmented Reality (AR) device, or the like. Electronic device 101 may send data to a remote recipient, and/or may receive data from a remote recipient, and/or otherwise exchange data (e.g., packetized data) with a remote recipient or with multiple different remote recipients via the Internet 120.

Electronic device 101 may access the Internet indirectly, via an Access Medium 102; for example, via a Local Area Network (LAN) or a Wireless LAN (W-LAN) that the electronic device communicates with, and which transfers data packets (e.g., TCP/IP packets, HTTP packets, HTTPS packets, FTP packets, or the like) from the electronic device 101 to a first router which may be referred to as West Router 103.

West Router 103 is a physical real-world network router or network switch; and it interfaces via a first interface, denoted Interface-1 or "I/F1" 104 with a first Virtual LAN (V-LAN) 105 (also referred to as the West V-LAN). The first V-LAN 105 further interfaces, via a second interface denoted Interface-2 or "I/F2" 106 with a Virtualized Network Function 107 (denoted Virtualized-NF or V-NF; or also referred to as a Virtualized Network Application; and which is the L3-layer transparent proxy); which in turn further interfaces, via a third interface denoted Interface-3 or "I/F3" 108 with a second Virtual-LAN (V-LAN) 109 (also referred to as the East V-LAN); which in turn interfaces via a fourth interface denoted Interface-4 or "I/F4" 110 with a second physical router denoted East Router 111, which is a physical real-world router that communicates with the Internet.

The Virtualized NF 107 is thus connected via at least two interfaces (I/F2 and I/F3), connecting it to both sides of the network (west side, east side). Each one of those two interfaces (I/F2 and I/F3) is implemented as an Address Resolution Protocol (ARP) proxy and/or as a Neighbor Discovery (ND) proxy, and answers ARP queries and/or ND queries (e.g., for an IP address that is within its immediate network); such as, by being aware of the real destination of an IP packet, yet providing a "fake" address, such as the actual MAC address of the Interface, as the final destination of the IP packet. The construction of the Interface Pair (of I/F2 and I/F3) enables the V-NF 107 to operate as a transparent L3 proxy in between the two interfaces (I/F2 and I/F3), in a manner that is completely transparent to the West Router 103 and to the East Router 111 (and to other network elements or network participants, such as Electronic Device 101), and without requiring the V-NF 107 to comprise or to implement any routing protocols.

The two V-LANs, namely, the West V-LAN 105 and the East V-LAN 109, are constructed and defined as two segments or as two different address-ranges of the same single subnet. Accordingly, the two routers, namely, the West Router 103 and the East Router 111, have interface and communicate with each other on the same single subnet (which may be referred to as the West-East Subnet). The West-East Subnet is thus split or divided into two IP address ranges, each IP address range being on (and being managed by) a different V-LAN. On the West side, the West V-LAN 105 connects the West Router to the west-side I/F2 of the V-NF, and manages the lower address range of the West-East Subnet. On the East side, the East VLAN 109 connects the East Router to the east-side I/F3 of the V-NF, and manages the upper address range of the West-East Subnet.

In a demonstrative implantation, for example: the entire single West-East Subnet corresponds to IP address 10.0.0.0/24; the West V-LAN defines, includes and manages the lower half of the address range of the West-East Subnet, which is from 10.0.0.1 to 10.0.0.127; the East V-LAN defines, includes and manages the upper half of the address range of the West-East Subnet, which is from 10.0.0.128 to 10.0.0.254. The first interface I/F1 is defined as IP address 10.0.0.1/24; the second interface I/F2 is defined as IP address 10.0.0.2/24; the third interface I/F3 is defined as IP address 10.0.0.128/24; the fourth interface I/F4 is defined as IP address 10.0.0.129/24.

In a demonstrative flow of traffic, the electronic device 101 sends (arrow 151) outgoing data packets to the West Router 103, which in turn needs to forward those data packets to the East Router 111, which in turn delivers them to their final destination (recipient) on or through the Internet 120. The East Router 111 is the Next Hop Router (NHR) for the West Router 103; and the West Router 111 forwards the packets to interface I/F1 of the West Router 103 for the purpose of forwarding them to the East Router.

The West Router 103 searches (or queries for) the MAC address of the interface of the East Router, for example (arrow 153) by using an ARP/ND query (e.g., an ARP query for IPv4; an ND query for IPv6). For demonstrative purposes, FIG. 1 refers to "ARP" queries and responses; however, the present invention may similarly utilize ND or ARP/ND queries and responses.

The ARP/ND query from the West Router, can span (or, can be handled or processed) only within the West V-LAN, and therefore it will not reach the East Router; but rather, it will reach the east-side interface I/F2 of the V-NF. The V-NF is configured to act as a Proxy ARP/ND; it receives the ARP/ND query, an it responds to the West Router (arrow 154) with the ND MAC address on the west-side interface I/F2 of the V-NF.

Now, based on the ARP/ND response, the traffic from the West Router towards the East Router is actually being sent (arrow 155) to the MAC address of the west-side interface I/F2 of the V-NF. Such traffic, which reaches the MAC address of the west-side interface I/F2 of the V-NF, is now processed by the V-NF which may perform one or more operations on such traffic (arrow 156); for example, DPI analysis, firewall operations, cyber-security operations, filtering operations, traffic discarding, traffic modification, traffic replacement, copying and storage of traffic, or the like. Upon completion of those processing operations, the traffic (or, modified traffic, or replacement traffic, if the original traffic was partially modified or replaced during the processing operations) is then forwarded (arrow 156) by the V-NF to its east-side interface I/F3.

The East Router is configured as the Next Hop Router (NHR) for traffic passing through the V-NF from West to East in that subnet; and therefore, the V-NF searches or queries via an ARP/ND query for the MAC address of the interface I/F4 of the East Router which is the next default gateway for the east-bound traffic. Then, the V-NF sends such east-bound traffic (arrow 157), from the east-side interface IF/3 of the V-NF, to the interface I/F 4 of the East Router; which in turn sends the packets (arrow 158) to the Internet 120 for delivery to their intended recipient.

A similar flow of operations is performed, in the opposite direction, with regard to west-bound traffic that flows east-to-west from the Internet towards the electronic device 101.

Additional components may be included in system 100, in order to implement the described functions and/or structure. For example, a Network Topology Definition and Deployment Unit may operate to construct or to span the V-NF with its pair of interfaces, and/or the V-LANs, and/or to otherwise configure these components (e.g., to define or configure which range of addresses each V-LAN manges).

It is noted that conventional NF appliances do not provide a method to be deployed inline without interfering the L3 network operations and/or without implementing routing protocols while running the NF application. For example, an L3 transparent proxy may receive traffic that is diverted from its original path in the network, and is passed to the proxy using a load balancer; however, such L3 transparent proxy has IP-based interfaces, and therefore the traffic to such L3 transparent proxy is forwarded directly to its IP interface(s), rather than being forwarded using proxy ARP technique which the present invention utilizes in order to force the traffic to pass through the V-NF.

Similarly, a router with Proxy ARP capability may use a proxy ARP method to enable communication between hosts on a directly-connected subnet when the hosts on the connected subnet cannot communicate directly with each other to communication isolation on the subnet. This may be partially applicable in a small-size high-proximity residential access network, where the network operator wishes to disable direct communication between its users (e.g., which are located on the same subnet) and wishes to force them to access the operator's routers in order for them to communicate. Such router uses proxy ARP to help the hosts communicate with each other over the LAN, but the router does not use the describe mechanism to perform any routing or any other network functionality as described above.

It is note that the V-NF may be implemented as a virtual module or unit or component, as a Virtual Machine (VM) or as a component within a VM, as a container or as part of a container, as a Docker implementation or container, as a Kubernetes implementation or container, as a simulated or emulated component, as an entirely-software component that is executed by a processor or computer or network node or network element, as an entirely-hardware component, as a hybrid hardware-and-software device, and/or by using other suitable implementations.

It is note that the west-side router, the east-side router, and/or other router or device or interface described above, may be implemented as a virtual module or unit or component, as a Virtual Machine (VM) or as a component within a VM, as a container or as part of a container, as a Docker implementation or container, as a Kubernetes implementation or container, as a simulated or emulated component, as an entirely-software component that is executed by a processor or computer or network node or network element, as an entirely-hardware component, as a hybrid hardware-and-software device, and/or by using other suitable implementations.

In some embodiments, a method comprises: (a) connecting and/or deploying and/or defining and/or creating a Virtualized Network Function (V-NF) between a west-side router and an east-side router which share a same single west-east subnet (e.g., this step may be performed by a V-NF creator unit or a V-NF deployment unit or a V-NF definition unit); (b) defining and/or creating and/or deploying a west-side interface in said V-NF, wherein the west-side interface of the V-NF is to receive incoming east-bound traffic from a west-side Virtual Local Area Network (V-LAN), wherein the west-side V-LAN is configured to manage a first range of addresses of said single west-east subnet (e.g., this step may be performed by a west-side interface creation unit or by a west-side interface definition unit or by a west-side interface deployment unit, or by a configuration unit or by a range-of-addresses configuration unit); (c) defining and/or creating and/or deploying an east-side interface in said V-NF, wherein the east-side interface of the V-NF is to send outgoing east-bound traffic towards an east-side V-LAN, wherein the east-side V-LAN is configured to manage a second, different, range of addresses of said single west-east subnet (e.g., this step may be performed by an east-side interface creation unit or by an east-side interface definition unit or by an east-side interface deployment unit, or by a configuration unit or by a range-of-addresses configuration unit); (d) receiving at said west-side interface of the V-NF, an incoming query from the west-side router which queries for a next destination for transferring east-bound packets that are sent east-bound from an electronic device through the west-side router (e.g., this step may be performed by an incoming query interceptor unit or by a query monitoring unit or by a query handler unit or by a query analysis unit); (e) responding to said query with a MAC address of the west-side interface of said V-NF (e.g., this step may be performed by a query responder unit, or by a MAC address finder and responder unit, or by a response creation and transmission unit); (f) receiving at said west-side interface of said V-NF, the east-bound packets from the west-side router (e.g., this step may be performed by the west-side interface of the V-NF, or by a packets receiving unit thereof); (g) performing in said V-NF one or more network function operations on said east-bound packets; and forwarding said east-bound packets within said V-NF, from the west-side interface to the east-side interface (e.g., this step may be performed by a network function unit able to perform one or more of such network function operations); (h) sending out said east-bound packets (e.g., optionally in their updated or modified or tampered format or structure, such as, after discarding or replacing or modifying some of them by the network function operations), from the east-side interface of the V-NF, to the east-side router which is a next default gateway for east-bound traffic (e.g., this step may be performed by a packets transmission module or unit).

In some embodiments, said east-bound packets pass through said V-NF with in a Layer-3 transparent passage. In some embodiments, said east-bound packets pass through said V-NF with in a Layer-3 transparent passage and without implementing or activating any routing protocols within said V-NF. In some embodiments, said east-bound packets pass through said V-NF with in a Layer-3 transparent passage and without implementing or activating any routing protocols within said V-NF and within said west-side interface and within said east-side interface.

In some embodiments, the first range of addresses and the second range of addresses, together define an entirety of addresses of said single west-east subnet. In some embodiments, the first range of addresses and the second range of addresses, together define an entirety of addresses of said single west-east subnet; wherein the first range of addresses is non-overlapping with the second range of addresses.

In some embodiments, the incoming query from the west-side router in step (d) is an Address Resolution Protocol (ARP) query within an IP-4 network; wherein step (e) is performed by sending, from the west-side interface of the V-NF to the west-side router, an ARP response that fakes a final destination of the east-bound packets as being the MAC address of the west-side interface of said V-NF.

In some embodiments, the incoming query from the west-side router in step (d) is a Neighbor Discovery (ND) query within an IP-6 network; wherein step (e) is performed by sending, from the west-side interface of the V-NF to the west-side router, an ND response that fakes a final destination of the east-bound packets as being the MAC address of the west-side interface of said V-NF.

In some embodiments, the west-side router is a first physical router device that is located in a first venue; wherein the east-side router is a second physical router device that is located in a second venue; wherein at least steps (a) through (c) are performed by deploying a virtual component in a cloud-based environment, and without connecting a physical proxy device between said west-side router and said east-side router.

In some embodiments, the west-side router is a first physical router device that is located in a first venue; wherein the east-side router is a second physical router device that is located in a second venue; wherein at least steps (a) through (c) are performed by performed by deploying a hardware component as a physical proxy hardware device in a cloud-based environment between said west-side router and said east-side router.

In some embodiments, the west-side router is a virtual router module that is located in a first venue; wherein the east-side router is a virtual router module that is located in a second venue; wherein at least steps (a) through (c) are performed by deploying a virtual component in a cloud-based environment, and without connecting a physical proxy device between said west-side router and said east-side router.

In some embodiments, wherein the west-side router is a virtual router module that is located in a first venue; wherein the east-side router is a virtual router module that is located in a second venue; wherein at least steps (a) through (c) are performed by deploying a hardware component as a physical proxy hardware device in a cloud-based environment between said west-side router and said east-side router.

In some embodiments, the incoming query from the west-side router (I) is intercepted by the west-side interface of said V-NF, and (II) does not reach the east-side router, and (III) is not processed by the east-side router, and (IV) is processed and responded by said V-NF via the west-side interface of said V-NF.

In some embodiments, the incoming query from the west-side router (I) is intercepted by the west-side interface of said V-NF, and (II) does not reach the east-side router, and (III) is not processed by the east-side router, and (IV) is processed and responded by said V-NF via the west-side interface of said V-NF; wherein, subsequent to the incoming query, east-bound packets that are directed from the west-side router to the east-side router are transparently intercepted by said V-NF which performs one or more network function operations on intercepted east-bound packets prior to forwarding them to the east-side router.

In some embodiments, the method comprises: forwarding through said V-NF one or more east-bound routing messages, which originate from the west-side router and are destined to the east-side router, wherein said east-bound routing messages are maintained in their original unmodified form.

In some embodiments, the method comprises: forwarding through said V-NF one or more east-bound Border Gateway Protocol (BGP) routing messages, which originate from the west-side router and are destined to the east-side router, wherein said east-bound BGP routing messages are maintained in their original unmodified form.

In some embodiments, said V-NF operates as a full-duplex unit that (i) intercepts east-bound queries and forwards east-bound packets from the west-side router to the east-side router, and also (ii) intercepts west-bound queries and forwards west-bound packets from the east-side router to the west-side router.

In some embodiments, step (g) comprises transparently performing in said V-NF one or more network function operations selected from the group consisting of: Deep Packet Inspection (DPI) analysis, firewall operations, traffic filtering, traffic modification, discarding of packets, replacement of packets. In some embodiments, such network function operations may include other suitable operations, for example: enforcement of traffic quota; enforcement of upstream traffic rules; enforcement of downstream traffic rules; selective enforcement of traffic rules on traffic and/or on packets that underwent DPI analysis and based on (or, by taking into account) results of DPI analysis (e.g., a type of application or an identity of application that sends and/or receives the packets; a type of message that is transported via said packets, such as, an email message, a chat message, an Instant Messaging item, a multimedia or audio/video item, an encrypted item, or the like); enforcement of Internet Service Provider (ISP) rules; enforcement of Cellular Service Provider (CSP) rules; enforcement of other pre-defined rules (e.g., parental control rules; government rules; law enforcement rules; content filtering rules; organizational rules with regard to allowed or disallowed types of traffic); performance of cyber security operations (e.g., applying virus detection or virus protection; applying malware detection or malware protection; applying phishing detection or phishing protection; or the like); and/or other suitable network functions or traffic-handling functions.

Some embodiments include a non-transitory storage medium having stored thereon instructions that, when executed by a machine, cause the machine to perform a method as described above. Some embodiments include an apparatus comprising: a hardware processor to execute program code, and a memory unit store program code; wherein the hardware processor is configured to execute program code which, when executed, causes said apparatus to perform a method as describe above.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process (es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using an "app" or application which may be downloaded or obtained from an "app store" or "applications store", for free or for a fee, or which may be preinstalled on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A method comprising:
   (a) connecting a Virtualized Network Function (V-NF) between a west-side router and an east-side router which share a same single west-east subnet;
   (b) defining a west-side interface in said V-NF, wherein the west-side interface of the V-NF is to receive incoming east-bound traffic from a west-side Virtual Local Area Network (V-LAN), wherein the west-side V-LAN is configured to manage a first range of addresses of said single west-east subnet;
   (c) defining an east-side interface in said V-NF, wherein the east-side interface of the V-NF is to send outgoing east-bound traffic towards an east-side V-LAN, wherein the east-side V-LAN is configured to manage a second, different, range of addresses of said single west-east subnet;
   (d) receiving at said west-side interface of the V-NF, an incoming query from the west-side router which queries for a next destination for transferring east-bound packets that are sent east-bound from an electronic device through the west-side router;
   (e) responding to said query with a MAC address of the west-side interface of said V-NF;
   (f) receiving at said west-side interface of said V-NF, the east-bound packets from the west-side router;
   (g) performing in said V-NF one or more network function operations on said east-bound packets; and forwarding said east-bound packets within said V-NF, from the west-side interface to the east-side interface;
   (h) sending out said east-bound packets, from the east-side interface of the V-NF, to the east-side router which is a next default gateway for east-bound traffic.

2. The method of claim 1,
   wherein said east-bound packets pass through said V-NF with in a Layer-3 transparent passage.

3. The method of claim 1,
   wherein said east-bound packets pass through said V-NF with in a Layer-3 transparent passage and without implementing or activating any routing protocols within said V-NF.

4. The method of claim 1,
   wherein said east-bound packets pass through said V-NF with in a Layer-3 transparent passage and without implementing or activating any routing protocols within said V-NF and within said west-side interface and within said east-side interface.

5. The method of claim 1,
   wherein the first range of addresses and the second range of addresses, together define an entirety of addresses of said single west-east subnet.

6. The method of claim 1,
   wherein the first range of addresses and the second range of addresses, together define an entirety of addresses of said single west-east subnet;
   wherein the first range of addresses is non-overlapping with the second range of addresses.

7. The method of claim 1,
   wherein the incoming query from the west-side router in step (d) is an Address Resolution Protocol (ARP) query within an IP-4 network;
   wherein step (e) is performed by sending, from the west-side interface of the V-NF to the west-side router, an ARP response that fakes a final destination of the east-bound packets as being the MAC address of the west-side interface of said V-NF.

8. The method of claim 1,
   wherein the incoming query from the west-side router in step (d) is a Neighbor Discovery (ND) query within an IP-6 network;
   wherein step (e) is performed by sending, from the west-side interface of the V-NF to the west-side router, an ND response that fakes a final destination of the east-bound packets as being the MAC address of the west-side interface of said V-NF.

9. The method of claim 1,
   wherein the west-side router is a first physical router device that is located in a first venue;
   wherein the east-side router is a second physical router device that is located in a second venue;
   wherein at least steps (a) through (c) are performed by deploying a virtual component in a cloud-based environment, and without connecting a physical proxy device between said west-side router and said east-side router.

10. The method of claim 1,
    wherein the west-side router is a first physical router device that is located in a first venue;
    wherein the east-side router is a second physical router device that is located in a second venue;
    wherein at least steps (a) through (c) are performed by performed by deploying a hardware component as a physical proxy hardware device in a cloud-based environment between said west-side router and said east-side router.

11. The method of claim 1,
    wherein the west-side router is a virtual router module that is located in a first venue;
    wherein the east-side router is a virtual router module that is located in a second venue;
    wherein at least steps (a) through (c) are performed by deploying a virtual component in a cloud-based environment, and without connecting a physical proxy device between said west-side router and said east-side router.

12. The method of claim 1,
    wherein the west-side router is a virtual router module that is located in a first venue;
    wherein the east-side router is a virtual router module that is located in a second venue;

wherein at least steps (a) through (c) are performed by deploying a hardware component as a physical proxy hardware device in a cloud-based environment between said west-side router and said east-side router.

13. The method of claim 1,
wherein the incoming query from the west-side router (I) is intercepted by the west-side interface of said V-NF, and (II) does not reach the east-side router, and (III) is not processed by the east-side router, and (IV) is processed and responded by said V-NF via the west-side interface of said V-NF.

14. The method of claim 1,
wherein the incoming query from the west-side router (I) is intercepted by the west-side interface of said V-NF, and (II) does not reach the east-side router, and (III) is not processed by the east-side router, and (IV) is processed and responded by said V-NF via the west-side interface of said V-NF;
wherein, subsequent to the incoming query, east-bound packets that are directed from the west-side router to the east-side router are transparently intercepted by said V-NF which performs one or more network function operations on intercepted east-bound packets prior to forwarding them to the east-side router.

15. The method of claim 1, comprising:
forwarding through said V-NF one or more east-bound routing messages, which originate from the west-side router and are destined to the east-side router, wherein said east-bound routing messages are maintained in their original unmodified form.

16. The method of claim 1, comprising:
forwarding through said V-NF one or more east-bound Border Gateway Protocol (BGP) routing messages, which originate from the west-side router and are destined to the east-side router, wherein said east-bound BGP routing messages are maintained in their original unmodified form.

17. The method of claim 1,
wherein said V-NF operates as a full-duplex unit that (i) intercepts east-bound queries and forwards east-bound packets from the west-side router to the east-side router, and also (ii) intercepts west-bound queries and forwards west-bound packets from the east-side router to the west-side router.

18. The method of claim 1,
wherein step (g) comprises transparently performing in said V-NF one or more network function operations selected from the group consisting of:
Deep Packet Inspection (DPI) analysis,
firewall operations,
traffic filtering,
traffic modification,
discarding of packets,
replacement of packets.

19. A non-transitory storage medium having stored thereon instructions that, when executed by a machine, cause the machine to perform a method comprising:
(a) defining a Virtualized Network Function (V-NF) between a west-side router and an east-side router which share a same single west-east subnet;
(b) defining a west-side interface in said V-NF, wherein the west-side interface of the V-NF is to receive incoming east-bound traffic from a west-side Virtual Local Area Network (V-LAN), wherein the west-side V-LAN is configured to manage a first range of addresses of said single west-east subnet;
(c) defining an east-side interface in said V-NF, wherein the east-side interface of the V-NF is to send outgoing east-bound traffic towards an east-side V-LAN, wherein the east-side V-LAN is configured to manage a second, different, range of addresses of said single west-east subnet;
(d) receiving at said west-side interface of the V-NF, an incoming query from the west-side router which queries for a next destination for transferring east-bound packets that are sent east-bound from an electronic device through the west-side router;
(e) responding to said query with a MAC address of the west-side interface of said V-NF;
(f) receiving at said west-side interface of said V-NF, the east-bound packets from the west-side router;
(g) performing in said V-NF one or more network function operations on said east-bound packets; and forwarding said east-bound packets within said V-NF, from the west-side interface to the east-side interface;
(h) sending out said east-bound packets, from the east-side interface of the V-NF, to the east-side router which is a next default gateway for east-bound traffic.

20. An apparatus comprising:
a hardware processor to execute program code;
a memory unit store program code;
wherein the hardware processor is configured to execute program code which, when executed, causes said apparatus to perform:
(a) connecting a Virtualized Network Function (V-NF) between a west-side router and an east-side router which share a same single west-east subnet;
(b) defining a west-side interface in said V-NF, wherein the west-side interface of the V-NF is to receive incoming east-bound traffic from a west-side Virtual Local Area Network (V-LAN), wherein the west-side V-LAN is configured to manage a first range of addresses of said single west-east subnet;
(c) defining an east-side interface in said V-NF, wherein the east-side interface of the V-NF is to send outgoing east-bound traffic towards an east-side V-LAN, wherein the east-side V-LAN is configured to manage a second, different, range of addresses of said single west-east subnet;
(d) receiving at said west-side interface of the V-NF, an incoming query from the west-side router which queries for a next destination for transferring east-bound packets that are sent east-bound from an electronic device through the west-side router;
(e) responding to said query with a MAC address of the west-side interface of said V-NF;
(f) receiving at said west-side interface of said V-NF, the east-bound packets from the west-side router;
(g) performing in said V-NF one or more network function operations on said east-bound packets; and forwarding said east-bound packets within said V-NF, from the west-side interface to the east-side interface;
(h) sending out said east-bound packets, from the east-side interface of the V-NF, to the east-side router which is a next default gateway for east-bound traffic.

* * * * *